(12) United States Patent
Penrod et al.

(10) Patent No.: US 6,427,893 B1
(45) Date of Patent: Aug. 6, 2002

(54) METHOD AND APPARATUS FOR DEGATING PLASTIC MEMBERS FROM A RUNNER

(75) Inventors: Daniel Penrod; Curtis Miller, both of Seaford, DE (US)

(73) Assignee: Maryland Plastics, Inc., Federalsburg, MD (US)

( * ) Notice: Subject to any disclaimer, the term of this patent is extended or adjusted under 35 U.S.C. 154(b) by 0 days.

(21) Appl. No.: 09/412,833

(22) Filed: Oct. 5, 1999

(51) Int. Cl.[7] .................................................. B26F 3/00
(52) U.S. Cl. .......................... 225/106; 225/103; 225/93; 225/96.5
(58) Field of Search .................................. 225/106, 103, 225/93, 96, 96.5; 53/513

(56) References Cited

U.S. PATENT DOCUMENTS

| | | | | |
|---|---|---|---|---|
| 4,006,879 A | * | 2/1977 | Morrone ...................... 425/444 |
| 4,221,315 A | * | 9/1980 | Latchague ................... 225/103 |
| 4,646,954 A | * | 3/1987 | Happ ........................... 225/103 |
| 4,741,874 A | * | 5/1988 | Harrison ...................... 264/161 |
| 5,069,832 A | * | 12/1991 | Okumura et al. ............. 264/23 |
| 5,165,585 A | * | 11/1992 | Lisec ........................... 225/93 |
| 5,464,343 A | * | 11/1995 | Hepler ......................... 425/549 |
| 5,865,358 A | * | 2/1999 | Fernandez .................... 225/101 |

* cited by examiner

Primary Examiner—M. Rachuba
Assistant Examiner—Kim Ngoc Tran
(74) Attorney, Agent, or Firm—Stroock & Stroock & Lavan LLP

(57) ABSTRACT

A degater for degating a member from a runner is provided, the degater having a platform. The platform includes a first platform member and a second platform member. The first platform member is positioned adjacent the second platform member along a pivot axis, the first platform member and the second platform member being pivotable about the pivot axis from a respective first position, through an angle to a second position, and through a second angle to a third position. The first position is between the second position and third position. A hold-down member holds the member to the platform as at least one of the first platform member and second platform member move between the first, second and third positions.

8 Claims, 6 Drawing Sheets

METHOD AND APPARATUS FOR DEGATING PLASTIC MEMBERS FROM A RUNNER

BACKGROUND OF THE INVENTION

The present invention is directed to a method and apparatus for removing injection molded plastic members from the runner, and more particularly, for removing injected molded plastic runners from a member without the use of a knife.

Injection molding of plastic products has become one of the most common and popular ways for making plastic pieces such as forks, spoons, toys, or the like. In mass production, a single mold may produce dozens of individual pieces.

As shown in FIG. 1, it is conventional for the mold to produce a unitary plastic array 10. Array 10 includes a runner 12 extending the length of unitary array 10. Along runner 12 are attached the members 14 which will become the end product. By way of example, as shown, members 14 could be forks. Each member 14 is connected to runner 12 by a gate 16. For packaging and sale, members 14 are separated from runner 12.

It is known in the art to separate, or degate, members 14 from runner 12 utilizing a knife or cutting edge. This has been satisfactory, however, as the knife cuts the gate, it leaves vestige (a portion of gate 16) on the now separated fork 14. Often, the cut is inaccurate and at an angle, so that the vestige provides a slanted or sharp edge which can catch on the packaging or the skin of the end user of the finished product. Furthermore, because all of the pieces are made of plastic, the now degated runners can usually be recycled. Therefore, the cleaner the cut and the more of gate 16 which remains on runner 12 after degating the more efficient the recycling process.

Accordingly, it is desired to provide an improved degating method and apparatus.

SUMMARY OF THE INVENTION

A degating apparatus includes a first support platform for supporting the members affixed along one side of a runner and a second platform disposed adjacent the first platform for supporting the members affixed to the opposite side of the runner. The first platform and second platform are disposed in a first position in which the first plate is coplanar with the second plate along a pivot axis. The first platform pivots about the pivot axis through a positive angle relative to the first position to a first position and through a negative angle relative to the first position to a second position. The second platform also pivots about the pivot axis through a positive angle about the pivot axis to a second position and through a negative angle relative to the first position to a third position. In a preferred embodiment, the positive angle and negative angle are each at least 30 degrees from the first position.

Additionally, in a preferred embodiment, hold-down members are provided to maintain the plastic members against the respective platforms during movement between positions and to hold the runner in place during movement between positions.

During use, the unitary molded piece is placed on the first platform and second platform so that the platforms are in the first position, the runner is disposed between the platforms, and a first plurality of members extending from one side of the runner rest on the first platform and a plurality of runners extending from the opposite side of the runner rest on the second platform. The runner is held in position to remain in the plane of the first position while the platforms are rotated to the respective second positions and then to the respective third positions. The members are then removed from the first and second platforms.

Accordingly, an object of the invention is to provide an improved method and apparatus for degating.

Yet another object of the invention is to provide a method of degating which reduces the amount of vestige.

Yet another object of the invention is to increase the recycling efficiency of the injection molding process.

Still other objects of the invention will, in part be obvious, and will, in part, be apparent from the specification.

The invention accordingly comprises the several steps and the relation of one or more of such steps with respect to each of the others, and the apparatus embodying features of construction, combination(s) of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENT

Figure 1:
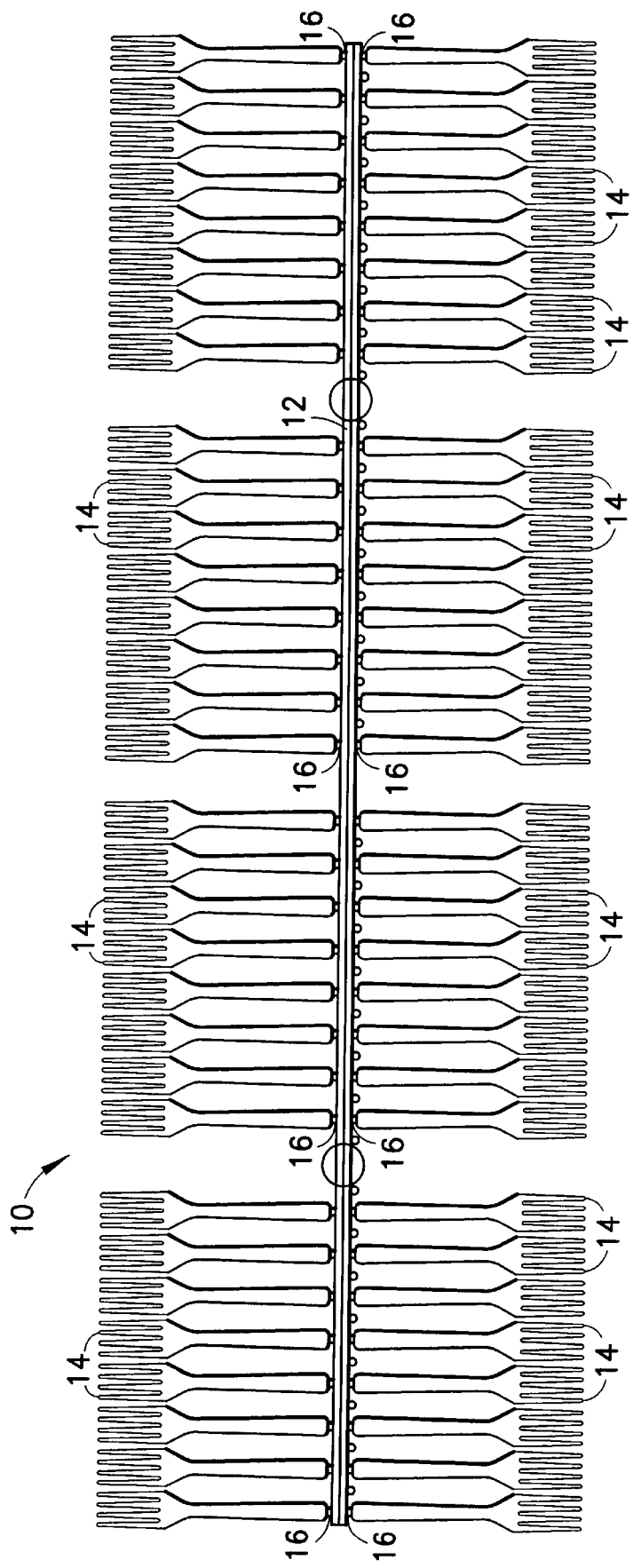
FIG. 1 is a top plan view of an array of forks attached to the runner after injection molding in accordance with the prior art.
Figure 2:
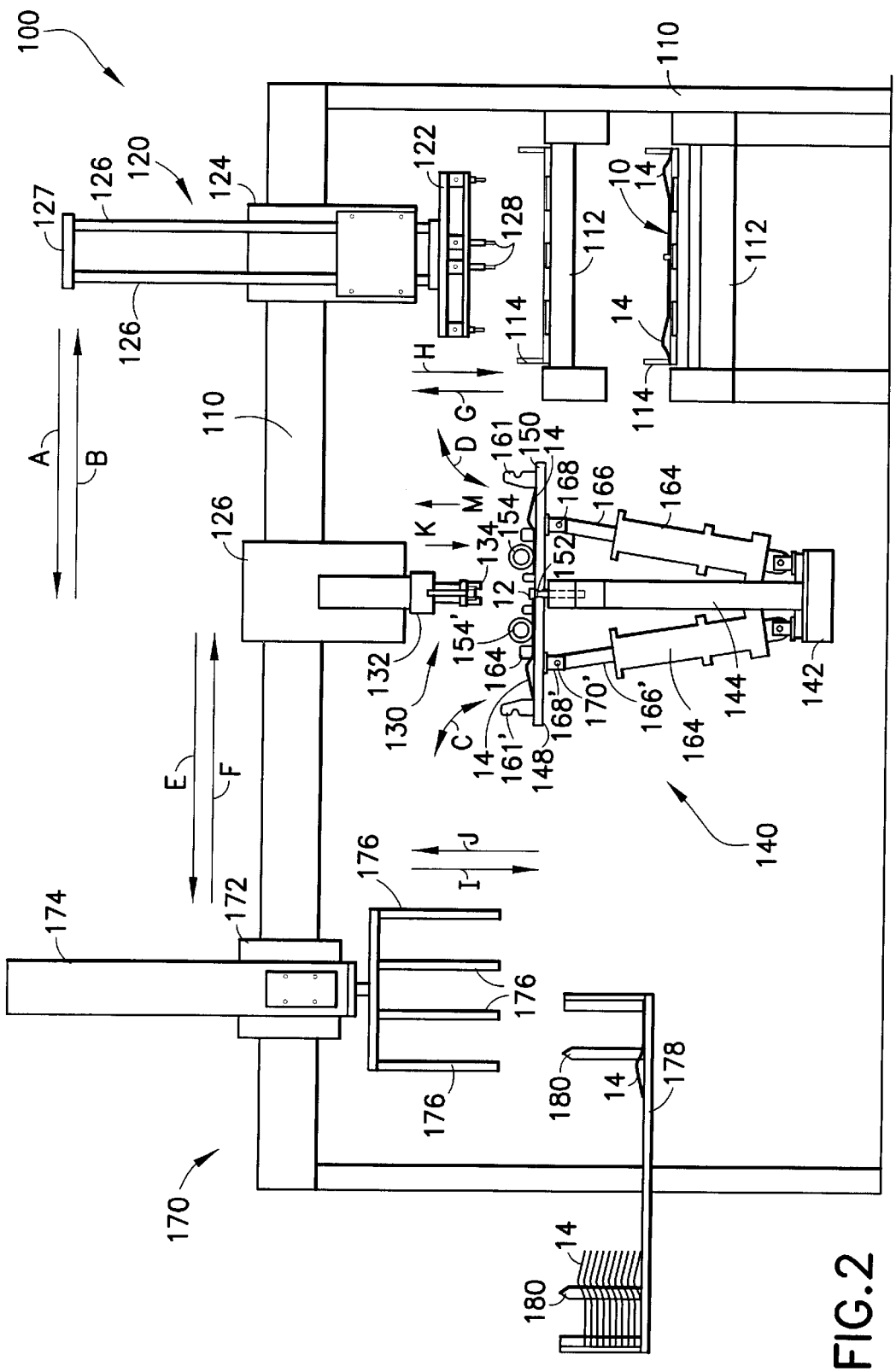
FIG. 2 is a schematic view of an apparatus for degating plastic molded members from a runner in accordance with the invention with a portion of the hold-down member removed for simplicity.

References are made to FIG. 2 in which an apparatus for degating members from a runner, generally indicated as 100, constructed in accordance with the invention as provided. Apparatus 100 includes a frame 110. Platforms 112 are affixed to frame 110. Trays 114 disposed on Platforms 112 hold an array 10 of forks 14.

A picker unit 120 includes a carriage 124 slideably mounted on frame 110 to reciprocally move in the direction of arrows A, B. Picker unit 120 includes arms 126 which are slideably mounted on carriage 124 and are joined by a cross bar 127 at one end and a grabbing head 122 at the other. Grabbing head 122 includes a picking mechanism, such as suction grips 128, by way of example, for removing array 10 of forks 14 from trays 114. Grabbing head 122 is moveable in an up-down direction towards and away from platforms 112 in the direction of arrows G and H as is known in the art.

A runner holder unit, generally indicated as 130, includes a carriage 126 mounted on frame 110 to reciprocally move along frame 110 in the direction of arrows A, B. A holding head 132 having fingers 134 reciprocally extends from carriage 126 and is also capable of movement in the direction of arrows K, M.

A flexing degater, generally indicated as 140, is disposed within frame 110 so as to be accessible for receiving arrays 10 picked by picker unit 120 and so that runner holder 130 can hold the runner of arrays 10 disposed thereon. Flex degater 140 includes a base 142 and a support 144 extending therefrom in a direction generally towards runner holder 130. A platform 146 is mounted on support 144. Platform 146 includes a first platform member 148 and a second platform 150 joined at a hinge 152 or other structure allowing first platform member 148 and a second platform member 150 to pivot relative to each other.

Figure 3:
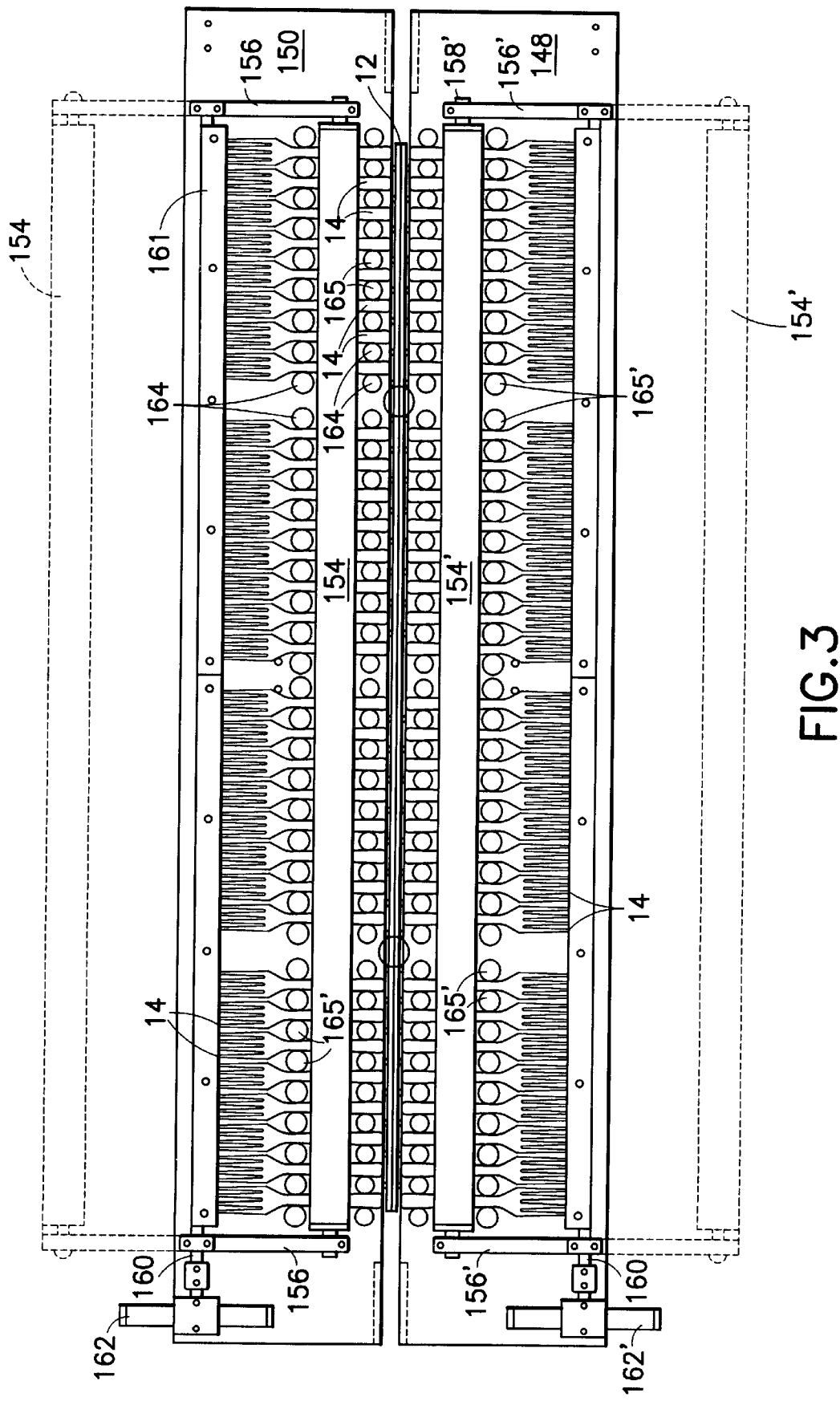
FIG. 3 is a top plan view of a degating platform constructed in accordance with the invention.

Reference is now also made to FIG. 3. For simplicity, descriptions are made only to second platform 150, the structure of first platform 148 being identical, like structures being indicated by like prime numbers. A post 161 is disposed on second platform 150. Arms 156 are mounted on either side of a shaft 160 rotatably supported by post 161. A hold-down bar 154 is mounted between arms 156. Hold-down bar 154 is rotatable in the directions of double headed arrow D (FIG. 2) between the position shown in phantom away from second platform 150 FIG. 3 and another position adjacent second platform 150 for maintaining forks 14 in place. A rotary actuator 116 is coupled to shaft 160 for rotating shaft 160 to rotate hold-down bar 154 in the directions of double headed arrow D. (Similarly, first platform 148 rotates in the directions of double headed arrow C (FIG. 2)). A plurality of retaining pins 165 extend from platform 150 to position forks 14 on platform 150 and to prevent lateral movement during degating.

A first cylinder 164 coupled to base 142 extends at an angle relative to support 144 towards second platform 150. A piston 166 is slideably mounted within cylinder 164 and exhibits reciprocating motion through cylinder 164. A bracket 168 pivotably mounted about a shaft 170 couples piston 166 to second platform 150. Similarly, a second cylinder 164' having a piston 166' reciprocally mounted therein is coupled to a bracket 168 by a shaft 170' to first platform member 148. As will be discussed in greater detail below, because platforms 146 and 150 are hingedly coupled to each other, motion of pistons 166, 166' cause first platform 148 and second platform 150 to move through an arc about the pivot axis of hinge 152. Cylinders 164 and pistons 166 act as actuators for moving the platforms as discussed below.

A stacker, generally indicated as 170, is slideably mounted on Frame 110 and exhibit reciprocal motion in the direction of arrows E, F. Stacker 170 includes a carriage 172 mounted to the frame for movement. An arm 174 is slideably mounted to the carriage and stacking fingers 176 are mounted at one end of stacker 170 on arm 174 and are moveable in the direction of arrows I, J. Stacker 176 removes degated forks from platform 176 and places them on a stacking platform 178 mounted on frame 110. Stacking platform 178 includes guides 180 for positioning degated forks 14 thereon.

Figure 4:
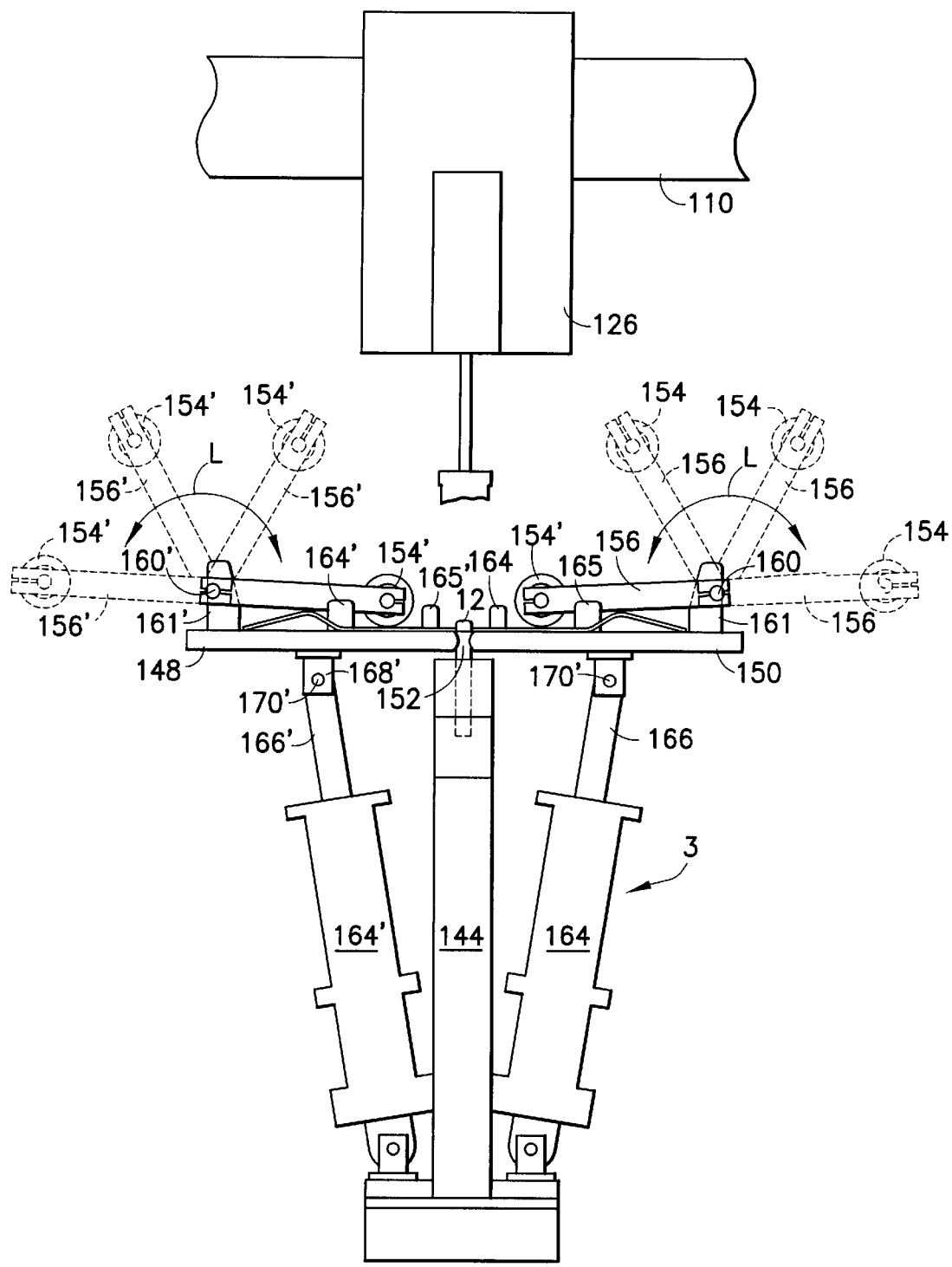
FIG. 4 is a side elevation view of a degater showing the movement of the hold bar in phantom in accordance with the invention.
Figure 5:
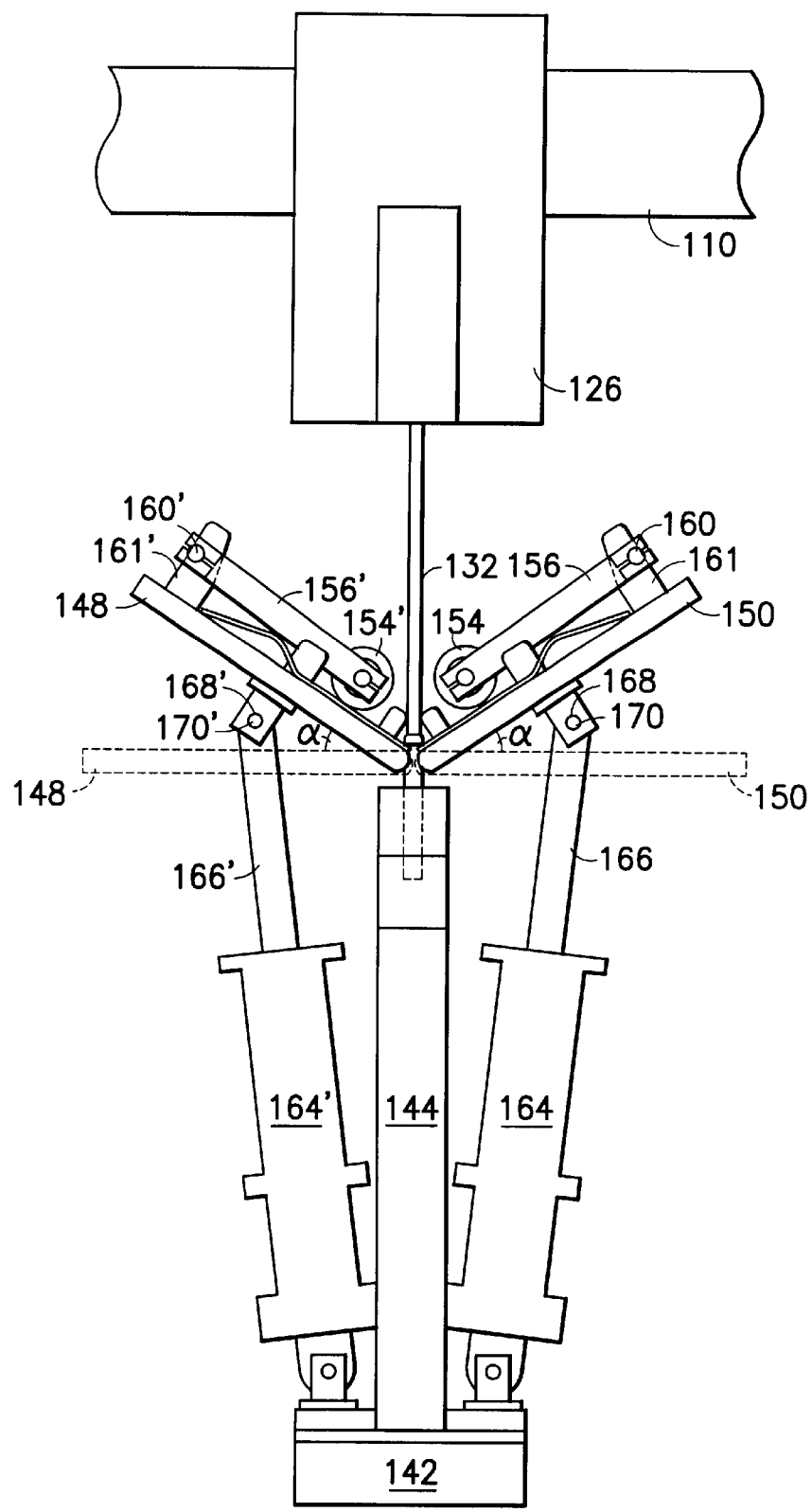
FIG. 5 is a side elevation view of the degater during use in a first flex position.
Figure 6:
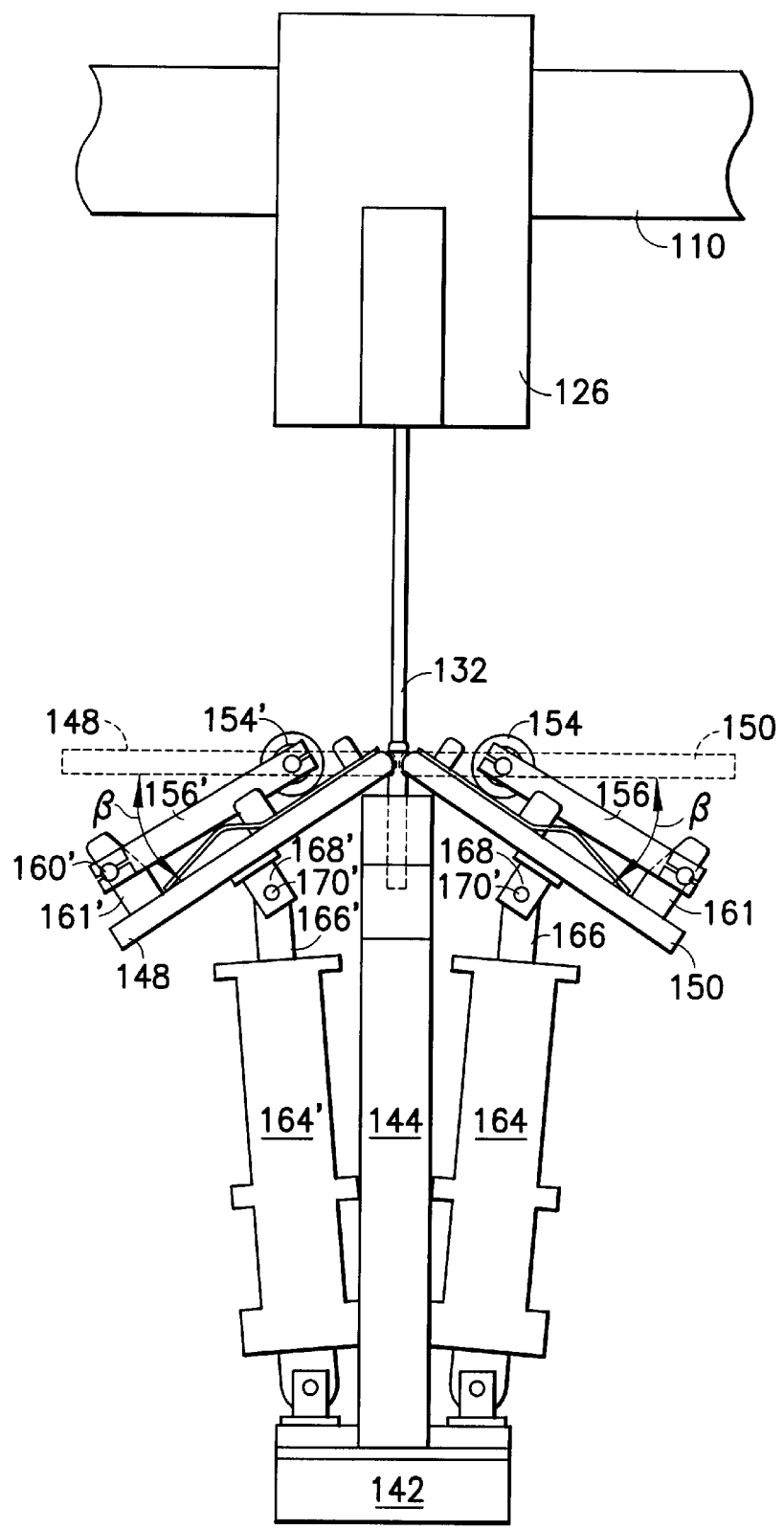
FIG. 6 is a side elevation view of the degater in a second operating position in accordance with the invention.

Reference is now also made to FIGS. 4–6 to explain the operation of degating apparatus 100. An array 10 of injection molded parts, such as forks 14, having a runner 12 is placed in a tray 114 of a platform 112. Grabbing head 122 of picker unit 120 moves down in the direction of arrow H and lifts array 10 from tray 114 through the use of suction heads 128 or some other picking device known in the art and moves in the direction of arrow G. Once grabbing head 122 has reached a sufficient height to clearly travel along frame 110, picker unit 120 moves in the direction of arrow A to a position above flexing degater 140. Picker unit 120 places array 10 on platform 146, releases array 10 and moves in the direction of arrow B to return to the picking position above platform 112.

Prior to picker unit 120 releasing array 10, flexer degater 140 is in the ready position in which hold-down bars 154 are rotated away from platform 146 as shown in phantom in FIG. 4. Once array 10 is placed on degator 140 and rotary actuator 162 is actuated to rotate shaft 160 causing hold-down bars 154, 154' to rotate in the direction of double headed arrows L towards platform 146. In this position, hold-down bars 154 hold forks 14 against platform 146 to prevent movement and jostling during degating. Locator pins 164 prevent lateral movement of the forks during degating.

Carriage 126 of runner holder 130 then moves in the direction of arrows E or F to position itself above runner 12 of array 10 and extends a hold-down bar 132 in the direction of arrow K (FIG. 2). In this first position, pistons 166 are partially extended from cylinders 164, 164' to form a flat table substantially perpendicular to runner hold-down bar 132. Pistons 166, 166' are activated to extend further from cylinder 164, 164'. Because brackets 168 are affixed to first platform member 148 and second platform member 150, and pivotably affixed to pivots 166, 166', they push first platform member 148 and second platform member 150 through respective positive angles α to respective second positions. Because forks 14 are held against platform members 148, 150 and runner 12 is held in place by runner hold-down bar 132, the forks 14 travel through an angle α relative to runner 12. Pistons 166, 166' are then withdrawn into cylinders 164, 164' respectively to return the platform members 148, 150 to the starting position shown in phantom and then through a negative angle β as shown in FIG. 6. The platform is then returned to the starting position, the movement of first platform member 148 and second platform member 150 relative to the stationery runner having broken the connection between the forks and the runner in a manner which limits the amount of vestige on the fork 14.

It should be noted that the platforms need not return to the first position, but can move smoothly and continuously through angles α and β. Also the motion can be first through angle β then through angle α as long as both angle α and angle β are traversed.

In the preferred embodiment, a single pass to a position through angle α and a return pass to a second position through angle β is sufficient to degate the forks 14 from runner 12. The inventors have found in a preferred embodiment, angle α is at least 30° and angle β is at least 30° for a total travel path through an arc of at least 60°.

Runner hold-down bar 132 is then released removing runner 12 from platform 148 by moving hold-down bar 132 in the direction of arrow M (FIG. 2).

Actuator 162 then causes shafts 160, 160', to rotate to move hold-down bars 154, 154' in the direction of double headed arrow LL in a direction away from platform 146 releasing forks 114. Stacker 170 then moves along frame 110 in the direction of arrow F and removes forks 14 from platform 146. Stacker 170 then moves in the direction of arrow E to position itself over stacking platform 178 where stacking fingers 176 release degated forks 14 onto stacking platform 178.

By providing a structure for degating injection molded members from the runner, by flexing the members, back and forth force relative to the runner, a structure and method for degating which reduces the amount of vestige on the degated member is provided.

It will thus be seen that the objects set forth above, among those made apparent form the preceding description, are efficiently attained and, since certain changes may be made in carrying out the above method in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A degater for degating a plastic molded member from a runner comprising:

a platform, said platform having a first platform member and a second platform member, said first platform member being positioned adjacent said second platform member along a pivot axis, said first platform member and said second platform member pivotable about said pivot axis from a respective first position, through an angle to a second position, and through a second angle to a third position, said first position being disposed between said second position and third position;

hold-down member for holding said member to said platform as at least one of said first platform member and second platform member move between said first, second and third positions; and at least one locator pin disposed on said platform for preventing movement of said member across said platform as said first platform member and said second platform member move between said first, second and third positions.

2. The degater of claim 1, wherein said first angle is at least 30°.

3. The degater of claim 1, wherein said second angle is at least 30°.

4. The degater of claim 1, wherein the sum of said first angle said second angle is at least 60°.

5. The degater of claim 1, further comprising a runner hold-down member for maintaining said runner in a fixed position during movement of said first platform member and second platform member.

6. The degater of claim 1, wherein said hold-down member includes a first hold-down bar rotatably mounted to said first platform member and rotating between a first position in which said hold-down member holds said member against said first platform member and a second position away from said first platform member and a second hold-down bar rotatably mounted to said second platform member and rotating between a first position adjacent said second platform member and a second position away from said second platform member.

7. The degater of claim 1, further comprising actuating members coupled to said first platform and second platform for moving said first platform and second platform between said first, second and third positions.

8. The degater of claim 7, wherein said actuating members include a cylinder and piston.

* * * * *